US008656320B2

(12) United States Patent
Gardin (10) Patent No.: US 8,656,320 B2
(45) Date of Patent: Feb. 18, 2014

(54) METHOD FOR CREATING A PHOTOLITHOGRAPHY MASK

(71) Applicant: STMicroElectronics (Crolles 2) SAS, Crolles (FR)

(72) Inventor: Christian Gardin, Lancey (FR)

(73) Assignee: STMicroelectronics (Crolles 2) SAS, Crolles (FR)

( * ) Notice: Subject to any disclaimer, the term of this patent is extended or adjusted under 35 U.S.C. 154(b) by 0 days.

(21) Appl. No.: 13/937,633

(22) Filed: Jul. 9, 2013

(65) Prior Publication Data

US 2014/0019920 A1  Jan. 16, 2014

(30) Foreign Application Priority Data

Jul. 12, 2012  (FR) .................................. 12 56727

(51) Int. Cl.
*G06F 17/50* (2006.01)
*G06K 9/00* (2006.01)
*G21K 5/00* (2006.01)
*G03F 1/00* (2012.01)
*G06F 19/00* (2011.01)
*G03F 1/36* (2012.01)
*G03F 1/38* (2012.01)

(52) U.S. Cl.
CPC ............ *G06F 17/5081* (2013.01); *G06F 19/00* (2013.01); *G06F 2217/12* (2013.01); *G06F 2217/14* (2013.01); *G06K 9/00* (2013.01); *G21K 5/00* (2013.01); *G03F 1/0069* (2013.01); *G03F 1/0092* (2013.01); *G03F 1/36* (2013.01); *G03F 1/38* (2013.01)
USPC ................. 716/53; 716/54; 716/55; 716/112; 700/110; 700/120; 700/121; 378/35; 430/5

(58) Field of Classification Search
CPC . G06F 17/5081; G06F 19/00; G06F 2217/12; G06F 2217/14; G06K 9/00; G21K 5/00; G03F 1/0069; G03F 1/0092; G03F 1/36; G03F 1/38
USPC ........ 716/53, 54, 55, 112; 700/110, 120, 121; 378/35; 430/5
See application file for complete search history.

(56) References Cited

U.S. PATENT DOCUMENTS 5,879,844 A * 3/1999 Yamamoto et al. ............. 430/30
6,238,824 B1 * 5/2001 Futrell et al. ...................... 430/5

(Continued)

OTHER PUBLICATIONS

Laurance et al., "Enabling Incremental RET to Exploit Hierarchical Structure Across Multiple Designs for Sub-100 nm Lithography", 25th Annual BACUS Symposium on Photomask Technology, Proceedings of SPIE, vol. 5992, 2005, pp. 1-8.*

(Continued)

*Primary Examiner* — Phallaka Kik
(74) *Attorney, Agent, or Firm* — Allen, Dyer, Doppelt, Milbrath & Gilchrist, P.A.

(57) ABSTRACT

A method for creating a photolithography mask from a set of initial mask cells arranged to form an initial mask. The set includes first and second initial mask cells having a mask element in common within an initial region of the initial mask. The method includes a creation of a first modified mask cell and of a second modified mask cell including OPC processing operations, a comparison of the position of the mask element in common between the first modified mask cell and the second modified mask cell, and if the result of the comparison is greater than a threshold, a creation of a new mask region including an optical proximity correction processing operation on the initial region, and a creation of the photolithography mask from the new mask region.

21 Claims, 6 Drawing Sheets

(56) References Cited

U.S. PATENT DOCUMENTS

| | | | | |
|---|---|---|---|---|
| 6,567,972 | B1* | 5/2003 | Tanaka et al. | 716/53 |
| 7,010,775 | B2* | 3/2006 | Ohmori | 716/52 |
| 7,157,194 | B2* | 1/2007 | Schroeder | 430/30 |
| 7,434,198 | B2* | 10/2008 | Strelkova et al. | 716/53 |
| 8,336,003 | B2* | 12/2012 | Cheng et al. | 716/53 |
| 2004/0019870 | A1* | 1/2004 | Ohmori | 716/19 |
| 2004/0202943 | A1* | 10/2004 | Dettmann et al. | 430/5 |
| 2005/0064302 | A1* | 3/2005 | Kotani et al. | 430/5 |
| 2006/0024594 | A1* | 2/2006 | Schroeder | 430/30 |
| 2007/0002322 | A1* | 1/2007 | Borodovsky et al. | 356/394 |
| 2007/0157152 | A1* | 7/2007 | Strelkova et al. | 716/21 |
| 2007/0262272 | A1* | 11/2007 | Kato | 250/492.21 |
| 2008/0270969 | A1* | 10/2008 | Wu et al. | 716/19 |
| 2009/0228860 | A1* | 9/2009 | Okada | 716/19 |
| 2010/0131915 | A1* | 5/2010 | Hirabayashi | 716/21 |
| 2011/0161894 | A1* | 6/2011 | Word et al. | 716/53 |
| 2011/0209106 | A1* | 8/2011 | Cheng et al. | 716/55 |
| 2012/0331428 | A1* | 12/2012 | Cheng et al. | 716/52 |
| 2013/0024824 | A1* | 1/2013 | Huang et al. | 716/53 |
| 2013/0157178 | A1* | 6/2013 | Tsai et al. | 430/5 |

OTHER PUBLICATIONS

Wang et al., "Exploiting Hierarchical Structure to Enhance Cell-Based RET With Localized OPC Reconfiguration", Design and Process Integration for Microelectronic Manufacturing, Proceedings of SPIE, vol. 5758, 2005, pp. 381-387.*

Zhang et al., "A New Method of Implementing Hierarchical OPC", Proceedings of the 6th International Symposium on Quality Electronic Design, IEEE, 2007, 5 pages.*

* cited by examiner

METHOD FOR CREATING A PHOTOLITHOGRAPHY MASK

TECHNICAL FIELD

The present disclosure relates to integrated circuits (ICs) and photolithography and, in particular, to the creation of masks used for photolithography.

BACKGROUND

Photolithography may be used to form patterns in resin layers by using masks. These masks comprise patterns that differ generally from the patterns formed in the resin layer. These differences of geometry are due to the so-called proximity effects. Typically, the photolithography masks are modified beforehand to account for the proximity effects by implementing so-called optical proximity correction (OPC) methods. Moreover, the proximity effects relating to the etching steps can also appear. The photolithography masks are modified, taking these effects into consideration. The term OPC is generally used for any mask modification method that corrects for optical or etching effects.

In a so-called OPC method, photolithography simulations are implemented that make it possible to compare a pattern simulated in a resin layer and the desired pattern. The result of this comparison is used to modify the mask used for the next simulation, or create the photolithography mask after a sufficient number of photolithography simulations.

To simplify the creation of photolithography masks and to reduce the time it takes for this creation, an approach may comprise organizing the pattern hierarchically, by using a plurality of cells. These cells may comprise other cells, and the lower level cells comprise patterns in the form of polygons. It is thus possible to implement a so-called OPC method on a cell and use this result for the creation of the mask that is simplified if the cell appears a number of times in the entire pattern of the mask.

This hierarchy can be produced prior to the implementation of the OPC method, for example, by forming a mask by copying the identical cells. It is nevertheless possible, during the implementation of the OPC method, to consider the mask as a pattern without hierarchy, and to form a new hierarchy more suited to the implementation of the OPC method.

To improve the quality of the mask created from cells, photolithography simulations are implemented that take into account the elements neighboring the cell once implanted in the mask. Better quality OPC results may be obtained. Nevertheless, only the result of the OPC method for the polygons contained in the cell is retained.

It is also possible to re-implement other OPC methods for the polygons situated in the neighborhood of the boundary between two cells when a cell comprises a number of cells on which so-called OPC methods have been implemented. An example of cells of a mask is shown in FIGS. 1a, 1b, 1c and 1d to illustrate the choice of the polygons on which the so-called OPC methods are typically implemented.

Figure 1A:
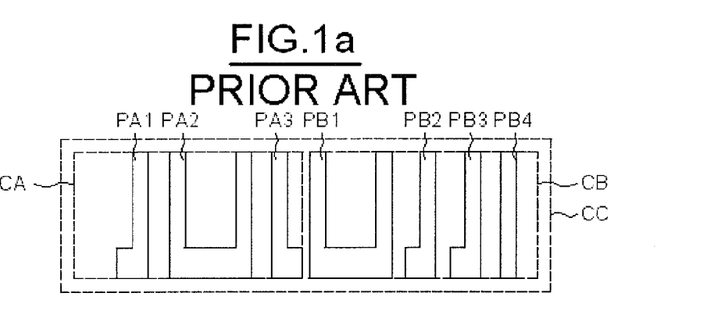
FIGS. 1a, 1b, 1c and 1d illustrate a photolithography mask creation method, according to the prior art.

A cell CC of a photolithography mask is shown in FIG. 1a. It can be noted that this cell corresponds to the initial design, or "layout" that is to be formed in a resin layer. The cell CC comprises a cell CA and a cell CB that are adjacent. Each of the cells CA and CB comprises a plurality of polygons, the cell CA comprises three polygons PA1, PA2 and PA3, and the cell CB comprises four polygons PB1, PB2 and PB3 and PB4.

Figure 1B:
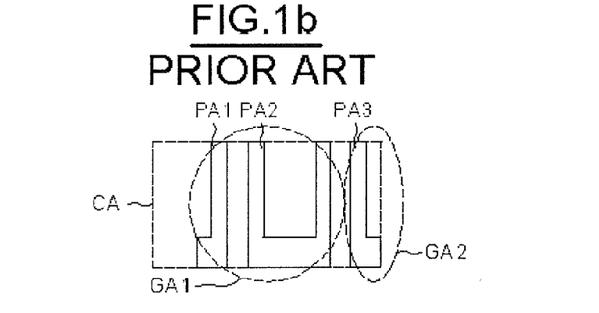

Prior OPC methods may have been implemented respectively for the cell CA and the cell CB. It is possible, typically, to implement other OPC methods on certain polygons to obtain a better photolithography mask. For example, the cell CA, which comprises a first group of polygons GA1, is represented in FIG. 1b. The first group of polygons GA1 comprises the polygons PA1 and PA2. The polygons of the first group GA1 do not have any additional neighbors when the cell CA is placed in the cell CC. On the other hand, a second group GA2, comprising the polygon PA3, corresponds to the polygons of the cell CA, which have a neighborhood no longer the same when the cell CA is in the cell CC. In other words, it is possible to retain the result of a prior OPC method for the polygons of the first group GA1, and it is preferable to re-implement an OPC method for the second group GA2 taking into account the neighborhood of this second group GA2 in the cell CC.

Figure 1C:
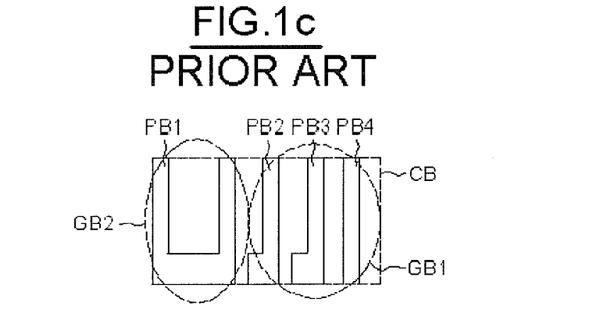
Figure 1D:
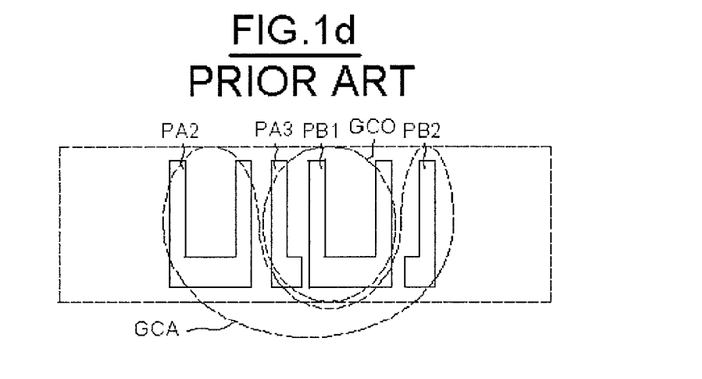

Similarly, it is possible to define a first group GB1 comprising polygons PB2, PB3 and PB4, and a second group GB2 comprising the polygon PB1 (FIG. 1c). The polygons which will be used to implement OPC methods for the cell CC are represented in FIG. 1d. A group GCO comprises the polygons for which an OPC method is implemented and for which the result of the OPC method will be retained. Another group of polygons is represented, namely the group GCA of additional polygons used only to implement photolithography simulations and for which the results of the OPC method are not retained.

Before fabricating the mask, a final checking step is generally implemented, in other words a photolithography simulation of the complete mask obtained after all the OPC methods, by eliminating any hierarchy to obtain a pattern comprising only polygons all situated on one and the same level. The elimination of the hierarchy to obtain a pattern comprising only polygons is an operation in which the mask is "flattened," which makes it possible to implement a "flat" simulation, as appreciated by the person skilled in the art.

During this checking step, errors may occur, and despite the implementation of the OPC methods that take into consideration the neighborhood of the polygons, which varies according to the arrangement of the cells. These errors may be due to a poor processing of the hierarchy, and the errors of this type are commonly referred by the person skilled in the art by the expression "hierarchical bug" or even a "patch boundary bug." An error should be understood notably to mean undesirable contacts appearing between patterns, undesirable openings, or even pattern sizes or gaps between patterns which are small enough to exceed recommended minimum dimensions.

The appearance of these errors is due to the use of hierarchically organized cells, whereas an OPC method implemented on the whole of the mask makes it possible to prevent the appearance of errors, but is not however applicable because it requires very long computation times and excessively large computer files. Furthermore, when an error is detected during a checking step, the correction of this error is particularly lengthy and costly. Another approach includes locally modifying the mask after the checking step, but this step may be complex to implement, and the repaired part may be difficult to integrate in the photolithography mask.

SUMMARY

According to an embodiment, a method for creating a photolithography mask may avoid errors due to the hierarchy of the cells.

According to an aspect, a method is for creating a photolithography mask from a set of initial mask cells arranged to form an initial mask. The set may comprise at least one first and at least one second initial mask cell having at least one mask element in common. One of the cells may be able to be included in the other cell, and the mask element may be in common and able to be a polygon segment within an initial region of the initial mask. The method may include a creation of a first modified mask cell comprising a first optical proximity correction processing operation on the first initial mask cell, a creation of a second modified mask cell comprising a second optical proximity correction processing operation on the second initial mask cell, a comparison of the position of the mask element in common between the first modified mask cell and the second modified mask cell and, and if the result of the comparison is greater than a threshold, a creation of a new mask region comprising a third optical proximity correction processing operation on the initial region, and a creation of the photolithography mask from at least the new mask region.

The set of initial mask cells may be arranged to form an initial mask corresponding to a mask structure that is hierarchically organized. This hierarchy may have been implemented at any time prior to the steps of creating modified mask cells. Furthermore, the term "cell" should be understood to mean any mask portion, the person skilled in the art being able to designate the cells by various terms: "cell," "tile," or even "patch." The initial cells may also be generated only with a view to the implementation of OPC methods.

The comparison step may make it possible to detect whether the results of two different OPC methods are different. If there is a difference in position for a polygon segment for which an optical proximity correction processing operation has been implemented in different conditions, then this may indicate that an error due to the hierarchy is likely to appear. It is then possible to implement an OPC method for an area, for example, the initial region, that is sufficiently broad to take the neighborhood of the segment into consideration.

The photolithography mask can be created from an additional region of dimensions less than the new mask region. Thus, it is possible to retain, for the production of the new mask region, only certain polygons or segments adjacent to the element in common, even if the OPC method uses a wider region for its simulations.

According to another aspect, a computer system is proposed, for example, a portable or non-portable computer or even a processor and its associated memories. The computer system may include a module configured to implement the method as defined above. According to another aspect, a computer program product is proposed which can be loaded directly into a memory of a computer system, comprising software code portions for the execution of the method as defined above when the program is run on the computer system. According to yet another aspect, a non-transitory computer readable medium that can be read by a computer system is proposed, having instructions that can be run by computer suitable for provoking the execution by the computer system of the method as defined above.

BRIEF DESCRIPTION OF THE DRAWINGS

Other advantages and features of the invention will become apparent on examining the detailed description of implementations and embodiments, in no way limiting, and the appended drawings in which.

DETAILED DESCRIPTION OF THE PREFERRED EMBODIMENTS

Figure 2:
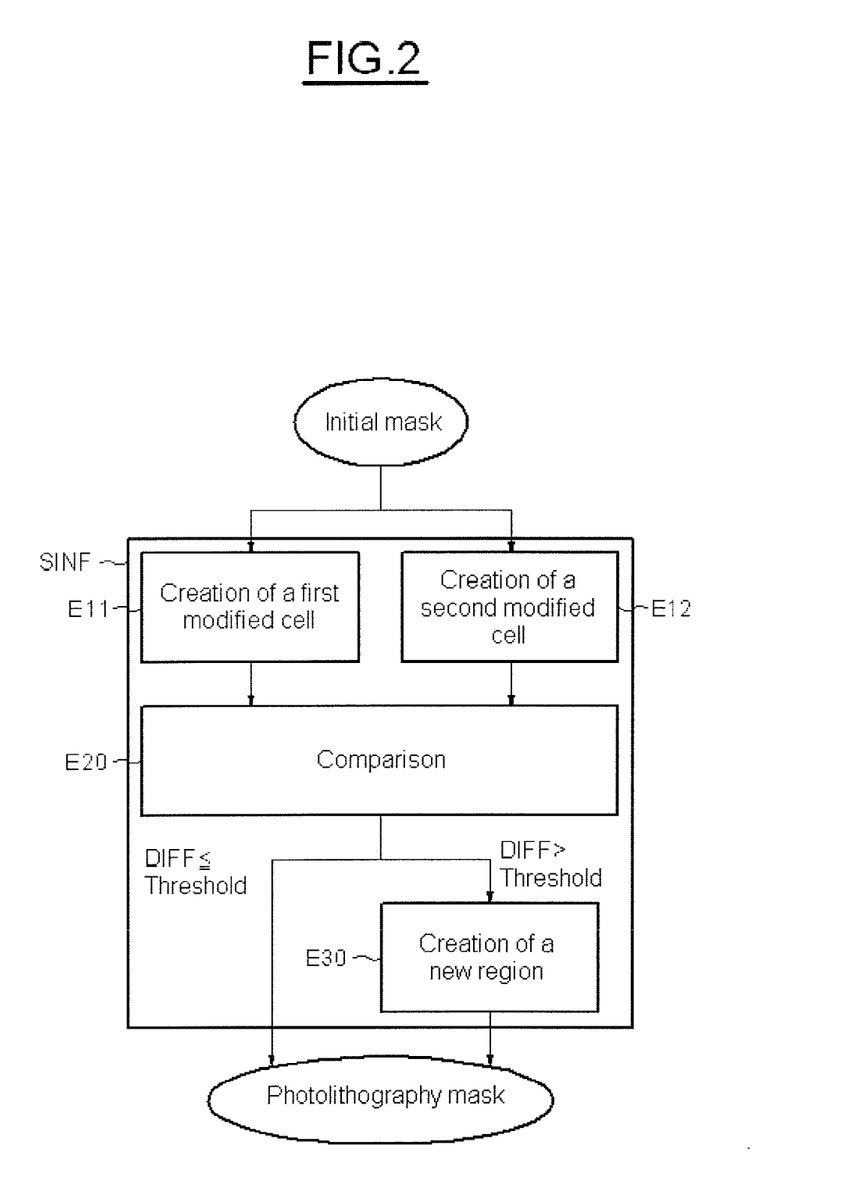
FIGS. 2-4 are schematic diagrams of different steps of an embodiment of a method, according to the present disclosure.

In FIG. 2, the reference SINF designates overall a computer system, for example, a computer, comprising means, such as a central processing unit and memory configured to implement an implementation of the method according to the present embodiments. According to the embodiment illustrated in FIG. 2, the creation of a first modified cell (step TE11) and the creation of a second modified mask cell (step E12) are performed first. These creations are implemented by way of an initial mask, which is created from a set of initial mask cells. For each initial mask cell E11 and E12, an optical proximity correction processing operation is performed.

A comparison (step E20) can then be implemented, which relates to at least one element in common to the two cells. If the result DIFF of this comparison is greater than a threshold, a new photolithography mask region is created (step E30) making it possible to obtain a photolithography mask. If, on the other hand, the result DIFF is less than or equal to the threshold, the photolithography mask is directly obtained.

Figure 3:
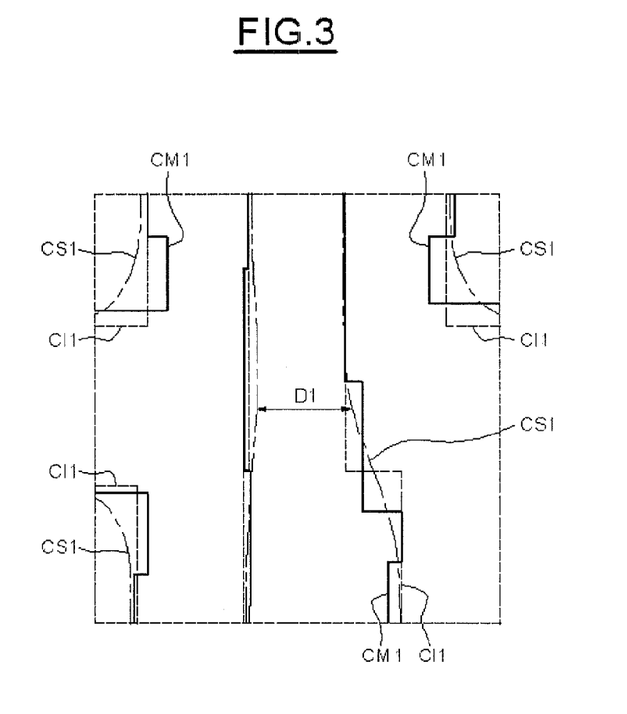

Now follows a description, with reference to FIGS. 3-7, of an exemplary implementation of a method according to the present disclosure on a portion of an initial photolithography mask. More specifically, FIG. 3 shows a part of a first initial mask cell whose outlines are denoted CI1 and form a set commonly designated by the term "polygon." The step E11 described with reference to FIG. 2 can be implemented here by an OPC method (comprising at least one photolithography simulation and at least one modification of the outline CI1). After the implementation of the OPC method, a modified outline CM1 (or modified polygon) is obtained. Finally, a photolithography simulation can be implemented on the basis of the modified outline CM1, which makes it possible to obtain a simulated outline CS1. An analysis according to typical criteria of the simulated outline CS1 indicates that no error will occur by using a mask formed from the outline CM1. It can be noted that the part of the cell represented after simulation (simulated outline CS1) comprises two elements (i.e. two strips of resin), which are separated by a distance D1.

Figure 4:
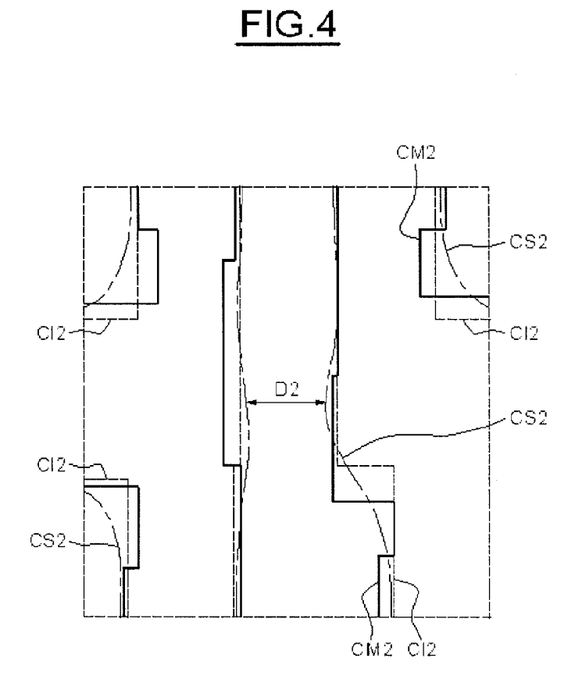

Similarly, FIG. 4 shows a part of a second initial mask cell whose outlines are denoted CI2. In the part represented here, the outline CI2 is the same as the outline CI1. As a non-limiting example, the second cell can be included in the first cell.

The modified outline CM2 (or modified polygon) obtained after an OPC method (step E12) differs from the outline CM1. This is because, even if the parts represented here are similar, the environment (not shown) may differ between the first and the second cells, and this environment modifies the results of an OPC method. It can now be noted that it is the two modified outlines CM1 and CM2 which will be compared during the implementation of the step E20.

A photolithography simulation can be implemented to obtain a simulated outline CS2, and the analysis of which according to typical criteria indicates that a simulated outline is obtained without errors. It can be noted that the gap between the two parts corresponds here to a distance D2, which is different from D1. The distances D1 and D2 are greater than the recommended minimum distances between two resin portions.

Figure 5:
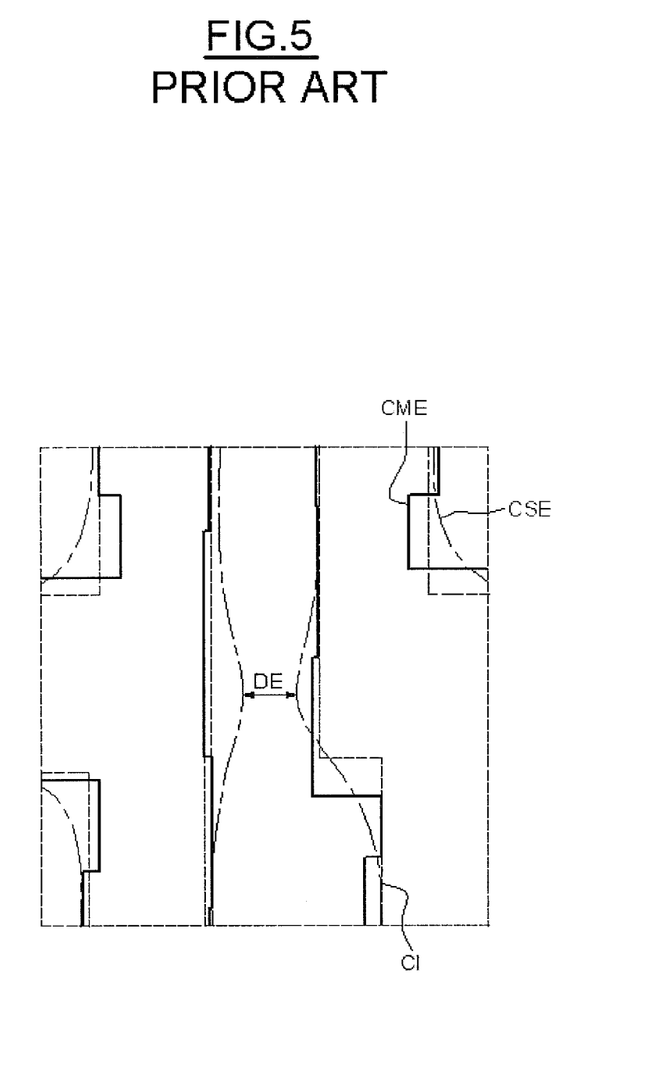
FIG. 5 illustrates a result obtained by a method, according to the prior art.

FIG. 5 shows the result obtained by a method according to the prior art, in which, after the creation of the outlines CM1 and CM2, segments of these outlines are selected to form a modified outline CME, which may possibly cause errors due to the hierarchy. A simulation can provide the simulated outline CSE in which the two resin strips are particularly close, spaced apart here by a distance DE. The distance DE is small enough here to be considered an error, which will stop the creation of the mask.

In the present embodiments, unlike the prior art, no outline is formed by way of the two modified outlines CM1 and CM2, but these outlines CM1 and CM2 are used to compare them (step E20) so as to obtain distance information that will be compared to a threshold. These two outlines have been superimposed in FIG. 6. More specifically, the outline CM1 has been represented by a dashed line, and the outline CM2 by a solid line.

Figure 6:
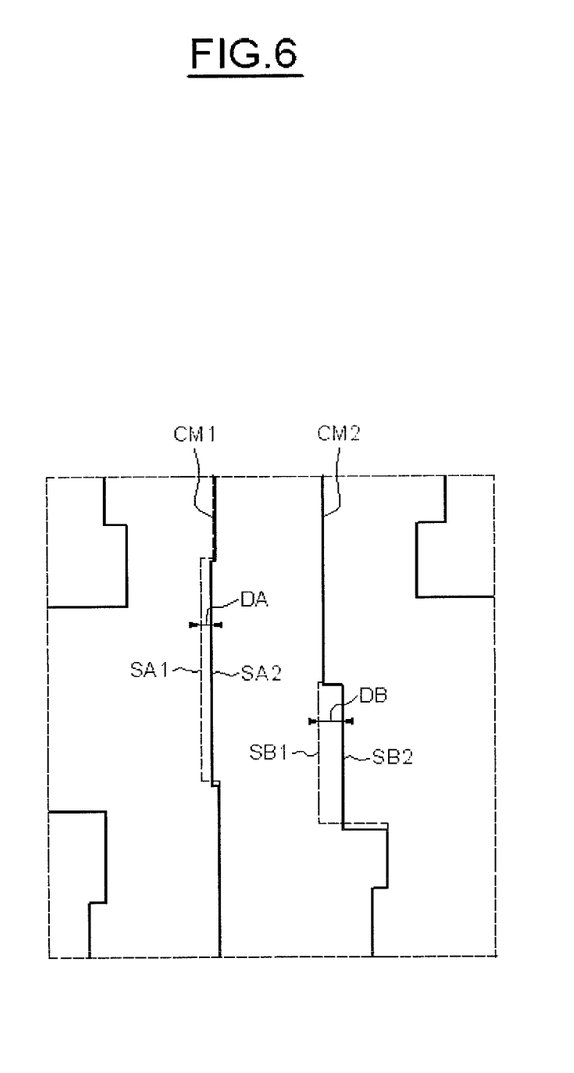
FIGS. 6 and 7 relate to an embodiment of the method, according to the present disclosure.

In this figure, it can be noted that two segments have a portion that is substantially different between the two outlines. More specifically, a segment SA1 of the line CM1 has a position that is different from a corresponding segment SA2 of the outline CM2. Moreover, a segment SB1 of the outline CM1 has a position that is different from a segment SB2 corresponding to the outline CM2. The segments SA1 and SA2 are separated by a distance DA, and the segments SB1 and SB2 are separated by a distance DB.

A distance threshold has been previously defined. By way of non-limiting example, if the photolithography step, corresponding to the mask has a fineness of 55 nanometers (for example, a photolithography for polycrystalline silicon layer intended to form CMOS transistor gate electrodes), the distance threshold may be of the order of 10 nanometers.

In the illustrated example, if the distance DA is less than 10 nanometers, it can be estimated that there is no risk of an error due to the hierarchy of the cells. If the distance DB is greater than 10 nanometers, it can be estimated that there is a risk of an error due to the hierarchy of the cells. An additional OPC method is then implemented for a mask region comprising this segment (step E30). The dimensions of this region can be chosen to be broad, for example, a square having sides of 2.5 micrometers, which will make it possible to have a correct environment for the implementation of an OPC method. As evident, in this region, there are only polygons, and the OPC method is performed on a mask part that is flat, without cells.

The threshold can be chosen to be smaller so as to eliminate any risk of error due to the hierarchy of the cells. Nevertheless, a smaller threshold may result in an excessively long computation time. It is possible, after the OPC, to retain the results (i.e. the mask modifications), only for a region of smaller dimensions, for example, a square of 1.25 micrometers side.

Figure 7:
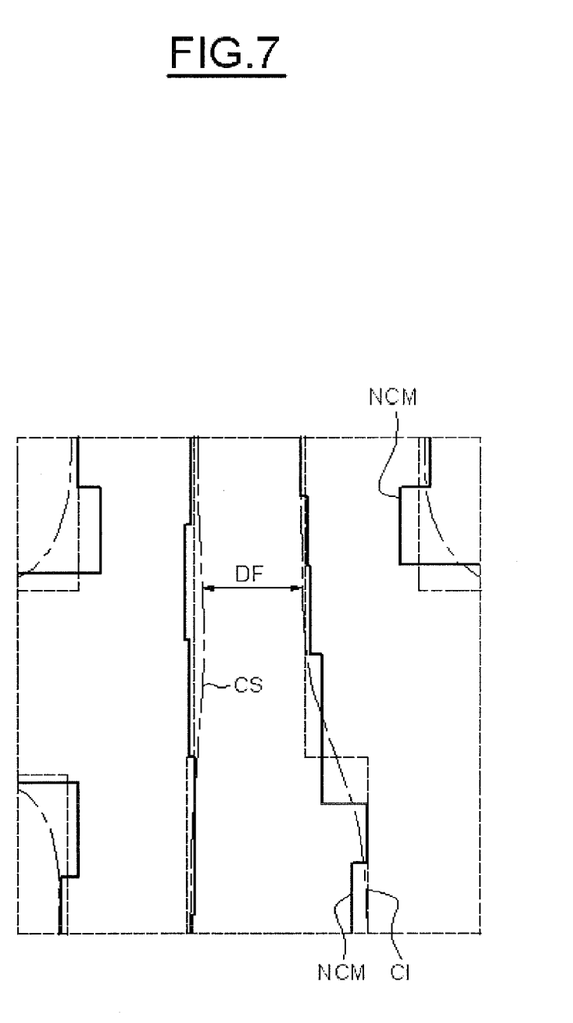

As illustrated in FIG. 7, a new modified outline NCM is obtained from an initial outline CI comprising the outlines CI1 and CI2, and it is possible to obtain a simulated outline CS of better quality than the outline CSE. Furthermore, the distance DF separating two parts is greater than the distance DE described with reference to FIG. 5, which indicates that there is a low probability of the two parts coming into contact. The new modified outline can then be used for the creation of the final photolithography mask.

It can be noted that a subsequent checking step can be implemented, and that, during this step, no error due to the hierarchy of the cells will be detected. According to one aspect, the present embodiments can therefore be implemented only during loops of the OPC methods, thereby making it possible to obtain the photolithography mask. It is therefore possible to prevent the errors due to the hierarchy and to do so without any subsequent repair step.

Moreover, because OPC methods on "flattened" mask portions (which may require high computation times) will be implemented only on portions where there is a risk of the appearance of hierarchical errors (determined during the step E20), the computation time necessary for the implementation of the present embodiments adds very little to the duration of the creation of the mask (one or two percent in practice), which is negligible compared to the implementation of a repair.

That which is claimed is:

1. A method for creating a photolithography mask from a set of initial mask cells arranged to form an initial mask, the set comprising at least one first initial mask cell and at least one second initial mask cell having at least one mask element in common within an initial region of the initial mask, the method comprising:
    forming a first modified mask cell by at least performing a first optical proximity correction (OPC) processing operation on the at least one first initial mask cell;
    forming a second modified mask cell by at least performing a second OPC processing operation on the at least one second initial mask cell;
    comparing, using a computer system, a position of the at least one mask element in common between the first modified mask cell and the second modified mask cell; and
    if a result of the comparing is greater than a threshold value, forming a new mask region by at least performing a third OPC processing operation on the initial region, and forming the photolithography mask from at least the new mask region.

2. The method according to claim 1 wherein each of the first and second OPC processing operations comprises a first lithography simulation respectively on the at least one first initial mask cell and the at least one second initial mask cell, and a second lithography simulation respectively on the first and second modified mask cells.

3. The method according to claim 1 wherein the first OPC processing operation is different from the second OPC processing operation.

4. The method according to claim 1 wherein the photolithography mask is formed from an additional region, the additional region having a size less than that of the new mask region.

5. The method according to claim 1 wherein the initial mask has a hierarchically organized mask structure.

6. The method according to claim 1 wherein the at least one second initial mask cell is in the at least one first initial mask cell.

7. The method according to claim 1 wherein the comparing is for detecting a difference between results of the first and second OPC processing operations.

8. A system comprising:
    a processor and memory cooperating therewith for creating a photolithography mask from a set of initial mask cells arranged to form an initial mask, the set comprising at least one first initial mask cell and at least one second initial mask cell having at least one mask element in common within an initial region of the initial mask, said processor and memory configured to
    form a first modified mask cell by at least performing a first optical proximity correction (OPC) processing operation on the at least one first initial mask cell,
    form a second modified mask cell by at least performing a second OPC processing operation on the at least one second initial mask cell,
    compare a position of the at least one mask element in common between the first modified mask cell and the second modified mask cell, and if a result of the comparing is greater than a threshold value, form a new mask region by at least performing a third OPC processing operation on the initial region, and forming the photolithography mask from at least the new mask region.

9. The system according to claim 8 wherein each of the first and second OPC processing operations comprises a first lithography simulation respectively on the at least one first initial mask cell and the at least one second initial mask cell, and a second lithography simulation respectively on the first and second modified mask cells.

10. The system according to claim 8 wherein the first OPC processing operation is different from the second OPC processing operation.

11. The system according to claim 8 wherein the photolithography mask is formed from an additional region, the additional region having a size less than that of the new mask region.

12. The system according to claim 8 wherein the initial mask has a hierarchically organized mask structure.

13. The system according to claim 8 wherein the at least one second initial mask cell is in the at least one first initial mask cell.

14. The system according to claim 8 wherein the comparing is for detecting a difference between results of the first and second OPC processing operations.

15. A non-transitory computer readable medium for reading by a computer system and having executable instructions for provoking execution by the computer system of steps for creating a photolithography mask from a set of initial mask cells arranged to form an initial mask, the set comprising at least one first initial mask cell and at least one second initial mask cell having at least one mask element in common within an initial region of the initial mask, the steps comprising:

forming a first modified mask cell by at least performing a first optical proximity correction (OPC) processing operation on the at least one first initial mask cell;

forming a second modified mask cell by at least performing a second OPC processing operation on the at least one second initial mask cell;

comparing a position of the at least one mask element in common between the first modified mask cell and the second modified mask cell; and if a result of the comparing is greater than a threshold value, forming a new mask region by at least performing a third OPC processing operation on the initial region, and forming the photolithography mask from at least the new mask region.

16. The non-transitory computer readable medium according to claim 15 wherein each of the first and second OPC processing operations comprises a first lithography simulation respectively on the at least one first initial mask cell and the at least one second initial mask cell, and a second lithography simulation respectively on the first and second modified mask cells.

17. The non-transitory computer readable medium according to claim 15 wherein the first OPC processing operation is different from the second OPC processing operation.

18. The non-transitory computer readable medium according to claim 15 wherein the photolithography mask is formed from an additional region, the additional region having a size less than that of the new mask region.

19. The non-transitory computer readable medium according to claim 15 wherein the initial mask has a hierarchically organized mask structure.

20. The non-transitory computer readable medium according to claim 15 wherein the at least one second initial mask cell is in the at least one first initial mask cell.

21. The non-transitory computer readable medium according to claim 15 wherein the comparing is for detecting a difference between results of the first and second OPC processing operations.

* * * * *

UNITED STATES PATENT AND TRADEMARK OFFICE
CERTIFICATE OF CORRECTION

| | | |
|---|---|---|
| PATENT NO. | : 8,656,320 B2 | Page 1 of 1 |
| APPLICATION NO. | : 13/937633 | |
| DATED | : February 18, 2014 | |
| INVENTOR(S) | : Gardin | |

It is certified that error appears in the above-identified patent and that said Letters Patent is hereby corrected as shown below:

In the Claims

Column 7, Line 4          Delete: "forming"
                          Insert: --form--

Signed and Sealed this
Ninth Day of September, 2014

Michelle K. Lee
*Deputy Director of the United States Patent and Trademark Office*